United States Patent [19]

Bettencourt

[11] 4,088,570

[45] May 9, 1978

[54] TOMATO HARVESTER SEPARATOR

[75] Inventor: Thomas S. Bettencourt, Isleton, Calif.

[73] Assignee: The Regents of the University of California, Berkeley, Calif.

[21] Appl. No.: 769,309

[22] Filed: Feb. 16, 1977

[51] Int. Cl.² ............................................. B07B 1/28
[52] U.S. Cl. ................................ 209/396; 130/30 R; 56/327 R
[58] Field of Search ............ 209/396, 121 (U.S. only); 130/30 R; 198/776, 698; 56/327 R; 171/27, 28

[56] References Cited

U.S. PATENT DOCUMENTS

| | | | |
|---|---|---|---|
| 3,203,430 | 8/1965 | Lorenzen et al. | 130/30 R |
| 3,252,464 | 5/1966 | Hill et al. | 56/327 R |
| 3,455,453 | 7/1969 | Hill | 209/396 |
| 3,986,561 | 10/1976 | Bettencourt et al. | 130/30 R |

*Primary Examiner*—Frank W. Lutter
*Assistant Examiner*—Jon Hokanson
*Attorney, Agent, or Firm*—Owen, Wickersham & Erickson

[57] ABSTRACT

An improved tomato harvester separator of the type having lengthwise extending bars with lengthwise extending gaps between them, has series of slender resilient fingers extending in both directions from alternate ones of the bars. This placement of the fingers, with alternating fingerless bars adjacent to the rows of fingers, avoids the progression of the tomato plants and their tomatoes to one side of the separator during shaking and separation, and therefore is particularly useful in harvesters wherein the stream of separated tomatoes is divided to two sides of the machine.

2 Claims, 7 Drawing Figures

TOMATO HARVESTER SEPARATOR

BACKGROUND OF THE INVENTION

The invention relates to crop harvesters, and more particularly to harvesters having separators which employ shaking action.

Examples of the type of harvester for which this invention is especially useful are shown in U.S. Pat. Nos. 3,203,430 and 3,252,464. In such a harvester, particularly effective with tomatoes, the tomato plants are first severed from their roots, then are lifted to a separating device where they are shaken to separate tomatoes from the plants. U.S. Pat. No. 3,252,464, shows a shaking device of the type to which this invention relates, where the shaking device comprises a number of longitudinally extending bars, alternate bars being mounted in different sets that move 180° apart in both up-and-down and fore-and-aft movement, preferably so that any one point on the bar moves in a circular path. Other shaking devices include, for example, longitudinally extending chains having projecting members which engage the tomato plants, the chains being shaken by forward-and-stopping or forward-and-aft movement, with no substantially up-and-down movement. In all such types of apparatus, the tomatoes are intended to be shaken from the vines or stems to fall down through the longitudinal gaps between the shaking members. The separated tomatoes are then collected on some type of conveyor below, which conveys them to sorting conveyors where the tomatoes are sorted to remove the culls. U.S. Pat. No. 3,203,430 shows a harvester wherein the stream of separated tomatoes is divided centrally and distributed to sorting areas on opposite sides of the machine. This is the type of harvester with which the present invention is most effective.

U.S. Pat. No. 3,455,453 disclosed an improved separator of the type employing up-and-down and fore-and-aft moving longitudinal members. Series of spaced resilient fingers extended from the longitudinal members substantially across the longitudinal gaps, so that materials such as stems, plants, and weeds were caught thereon and were carried to the rear of the separator and dumped to the ground instead of falling through with the tomatoes onto the separating conveyor. The fingers extended from only one side of each longitudinal member into the adjacent gap, and the fingers of all members extended in the same direction. While being effective to solve the problem to which that patent was directed, the finger placement tended to cause the tomato plants and their tomatoes to drift toward one side of the separator during shaking. An uneven distribution of tomatoes on the conveyor below resulted, and this has been undesirable in some circumstances, particularly in harvesters wherein the tomatoes on the conveyor are divided centrally and conveyed to two separate sorting areas on opposite sides of the machine. One side of the harvester would receive a surplus of tomatoes, while the other would receive very few.

SUMMARY OF THE INVENTION

The present invention is directed to and solves the problem of uneven tomato (or the fruit of other crops) distribution due to drifting of the plants to one side during shaking. Instead of extending from one side of every longitudinal separating member, the resilient fingers extend from both sides of alternate ones of the longitudinal members, with fingerless members extending between the members carrying the double rows of fingers. The fingers are connected near the bases of a row of upward projections of the longitudinal members which help "walk" the plants toward the downstream end of the separator. The result is an even shaking action on the tomato plants, tending to move the plants and tomatoes no more toward one side than toward the other. Thus, a generally even distribution of tomatoes or other crop fruit is maintained between the two sides of the machine, and sorting problems are avoided.

Other objects, advantages, and features of the invention will appear from the following description of a preferred form of the invention, based upon a separator of the type shown in U.S. Pat. Nos. 3,252,464 and 3,455,453, although the invention applies to other separators also.

DESCRIPTION OF THE PREFERRED EMBODIMENT

Figure 1:
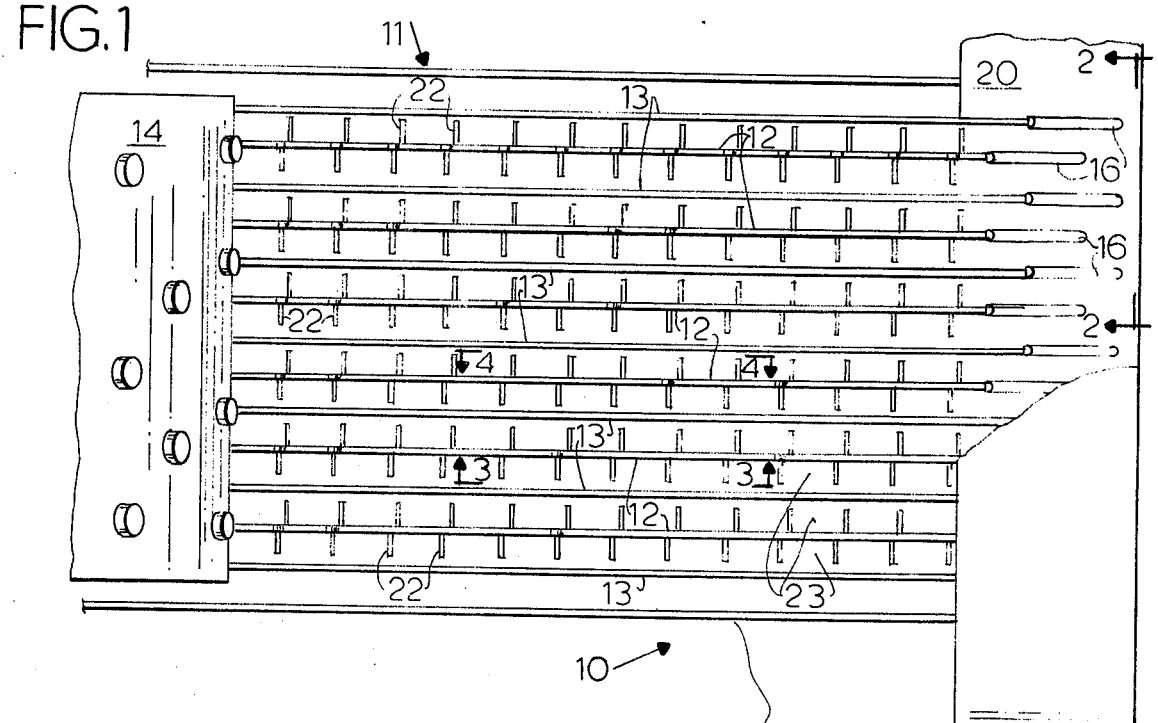
FIG. 1 is a plan view of a portion of a harvester including a separator device according to the invention, similar to that shown in U.S. Pat. No. 3,455,453 but with the resilient fingers extending from both sides of alternate longitudinally extending shaking bars.
Figure 2:
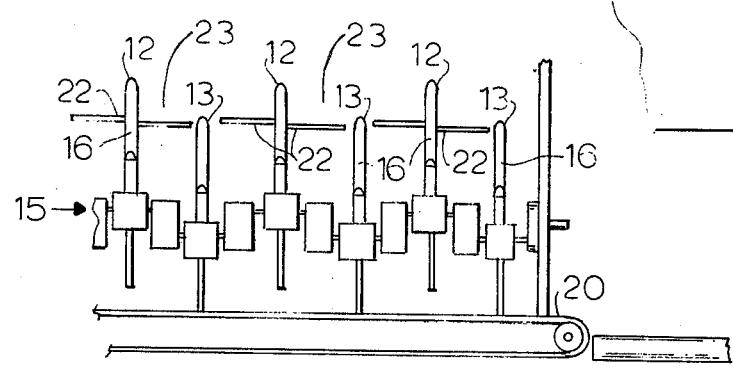
FIG. 2 is an elevation view of a portion of the separator taken along the line 2—2 of FIG. 1.

FIG. 1 shows a portion of a harvesting machine 10 for tomatoes and the like, including a shaking type separator device 11 having groups of alternating parallel walking bars 12 and 13 which move in opposite rotational directions, i.e. 180° out of phase from one another, as in the device of U.S. Pat. No. 3,455,453. As explained in that patent and in U.S. Pat. No. 3,252,464, the walking bars 12 and 13 receive the crop plants from a conveyor 14 at the forward end of the machine, shake them to separate and drop the fruit below, and at the same time advance the plants toward the downstream end of the separator (to the right in FIG. 1). At this downstream end, which is somewhat elevated from the upstream end, the plant stems, leaves, etc., are dropped over connecting webs 16 at the rear end of each bar 12 or 13. The webs 16 slope sharply downwardly and lead to a crankshaft indicated at 15 in FIG. 2.

Figure 7:
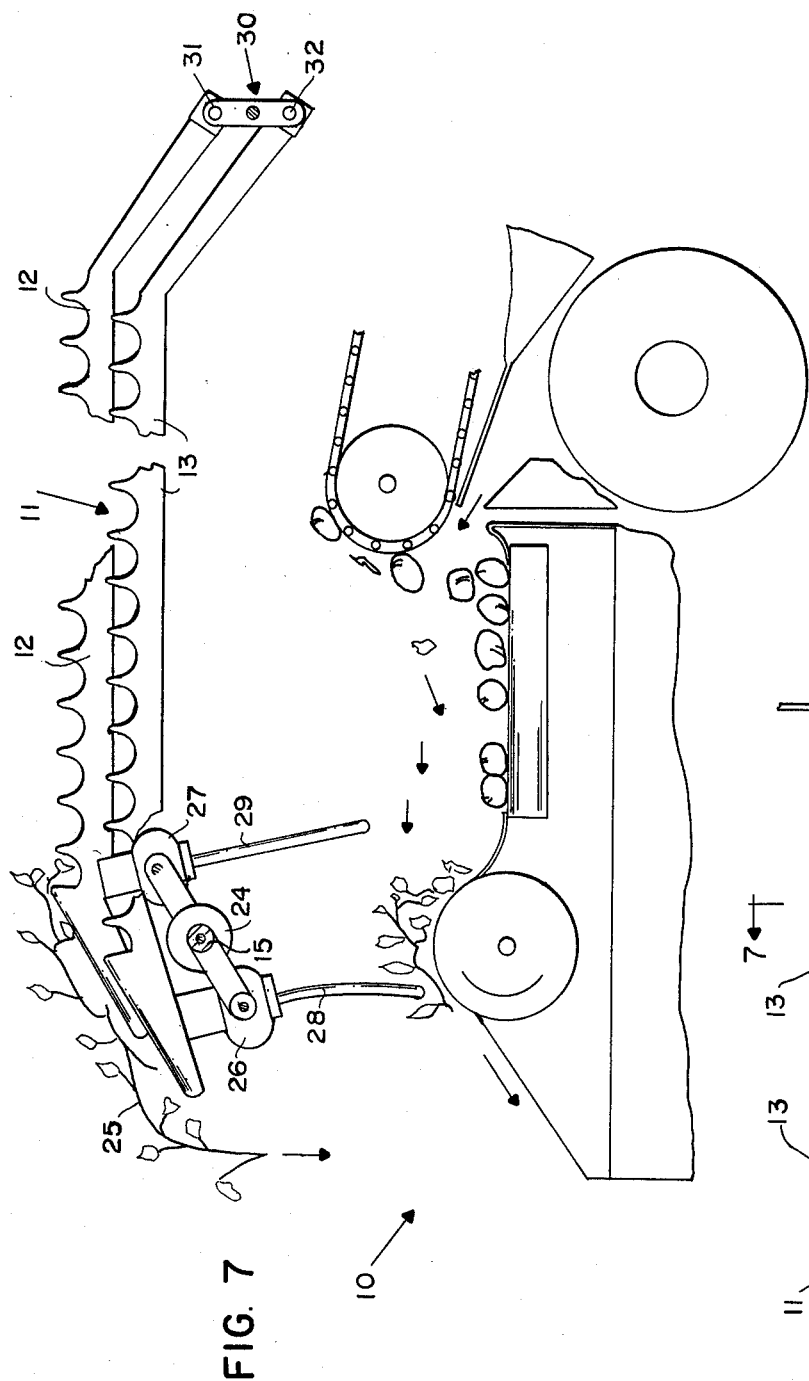
FIG. 7 is a view in section taken along the line 7—7 in FIG. 6.
Figure 6:
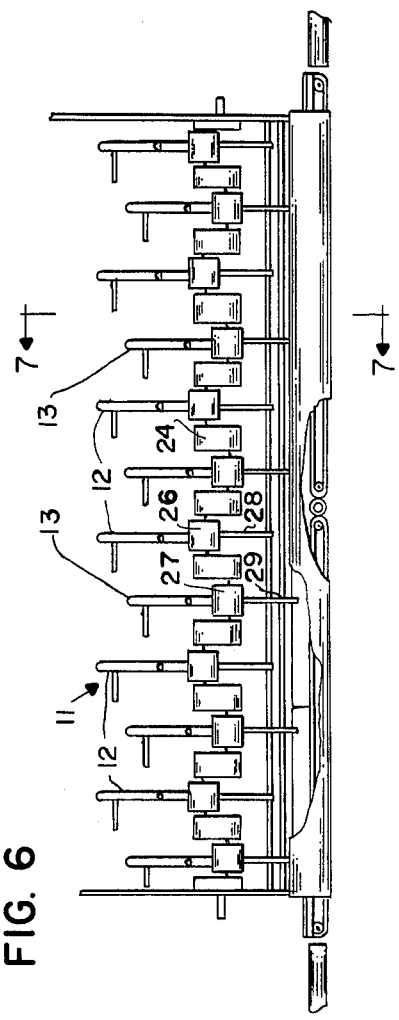
FIG. 6 is a more extensive view of the rear crankshaft assembly.

Referring to FIGS. 6 and 7, the shaker assembly 11 is seen to comprise a series of longitudinally extending walking bars, arranged in two sets, the bars in a first set denoted by the reference numeral 12 and those in the other set being denoted by numeral 13. Except for an improvement described hereinafter, the shaker assembly is similar to those shown in the assignee's U.S. Pats. Nos. 3,986,561, 3,455,453, 3,252,464, and 3,203,430.

The bars 12 and 13 are all journaled to a rear dual crank assembly 24, including the crankshaft 15, which rotates at a predetermined rate so that one set 12 of the bars moves upwardly and rearwardly while the other set moves forwardly in a downward position, (counterclockwise in FIG. 7). In this way, the vines and other vegetation from which the tomatoes have been separated move rearwardly to a point where they are dropped to the ground behind the harvester 10, as shown in FIG. 7 by the vine 25 falling off of the shaker assembly 11.

Each bar 12 and 13 is rotatably secured to the rear crank assembly 24 by a bushed journal 26 or 27 depending upon whether it is of the first set of bars 12 or the second set of bars 13. To the bottom of each journal 26 or 27 is mounted a resilient finger: there being two series of fingers, a first set of fingers 28 attached to the bottoms of the journals 26 and a second set of fingers 29 attached to the bottoms of the journals 27. The fingers 28 and 29 may be made of any suitable elastomeric material. A section of small diameter neoprene hose works well for each finger.

The two series 12 and 13 of walking bars are likewise journaled to a front dual crank assembly 30, so that bars 12 of the first series are bushed to crank pins 31 while bars 13 of the second series are bushed to crank pins 32. The front crank assembly 30 rotates in the same direction as the rear crank assembly 24 and is synchronized therewith so that the desired rearward walking effect of the bars 12 and 13 is achieved in the well known manner.

Figures 3, 4:
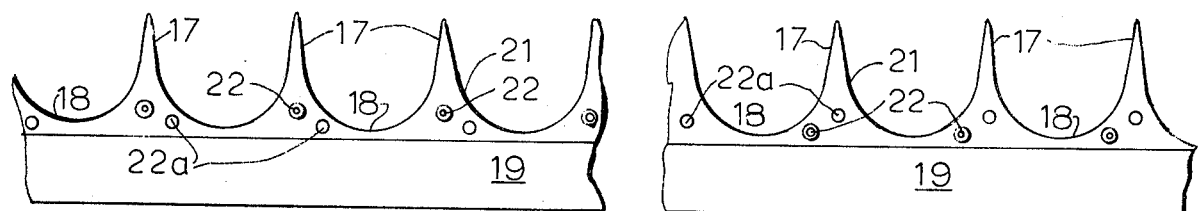
FIG. 3 is a side elevation view from between the shaking bars, taken along the line 3—3 of FIG. 1.
FIG. 4 is a view similar to FIG. 3, taken from the opposite direction along the line 4—4 of FIG. 1.
Figure 5:
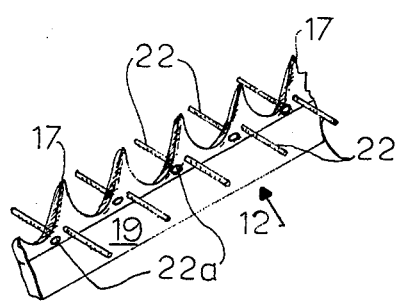
FIG. 5 is a perspective view of a portion of a shaking bar with fingers positioned according to the invention.

Each of the walking bars 12 and 13 includes a series of spaced upward projections 17 for helping to shake the plants and to walk them along the walking bars 12 and 13. These projections, which are somewhat resilient or at least coated with a resilient material to protect the fruit of the crop, and functionally analogous to the undulating resilient upper surface 13 of the walking bars of U.S. Pat. No. 3,455,453. The projections 17 of the present embodiment are more sharply defined and longer, with arcuate or U-shaped valleys 18 between them, as best seen in FIGS. 3, 4, and 5. As also illustrated in those figures, each bar 12 or 13 is comprised of a rigid base portion 19 of metal such as steel or aluminum, and an upper resilient part 21 of either hard rubber, metal with a protective coating of resilient material, or other suitable material which gives the projections 17 and valleys 18 a degree of protective resilience without flimsiness. The upper resilient portion 21 is connected to the base 19 by suitable fasteners such as bolts or rivets. Although only the bars 12 are illustrated in FIGS. 3, 4, and 5, their structure as described thus far applies to the alternating bars 13 as well.

The walking bars 12 and 13 are different in that each of the series of bars 12 and 13 are different in that each of the series of bars 12 has a series of horizontally extending resilient fingers 22 on both its sides. Extending nearly but not entirely across longitudinal gaps 23 between the bars 12 and 13, the fingers 22 are more resilient and yieldable than the projections 17. They are preferably made from rubber and are sufficiently resilient to give and let tomatoes and other such fruit force them down readily and then fall between them. The structure of the fingers themselves is similar to that of the fingers disclosed in the above-cited U.S. Pat. No. 3,455,453, but the placement of the fingers 22 and their relationship to the bars 12 and 13 is different and more advantageous, as further explained below. The flexing of the fingers is important because some tomatoes are likely to fall directly on the fingers and it is desirable that a finger so struck simply give, flex down, and let the tomato through without injuring it. However, when stems, grass, leaves, or other matter which can span the fingers begin to fall into the gaps 23, they do not have sufficient weight to cause the fingers to flex; they are simply carried along and eventually are discarded from the rear end of the shaker or separator 11 in the same manner as the tomato vines and other waste matter.

The fingers 22 extend from each side of each of the walking bars 12, but are omitted from the alternate bars 13, to avoid any tendency of the bars and fingers to shift the plants and fruit of the crop to one side of the separator 11 during the shaking, walking bar movement. It has been found that fingers positioned on one side only of every bar of the separator, with all fingers oriented toward the same side of the machine, will tend to cause a drifting of the crop toward that side of the machine. This results in an uneven distribution of tomatoes or other fruit on the conveyor below, which can be undesirable particularly in a harvester which divides the stream of tomatoes from the separator into left and right streams that eventually pass through separate left and right sorting areas.

With the finger placement of the present separator, all plants and tomatoes are uplifted by the bars more or less symmetrically, with no tendency to bias an uplifted tomato or plant toward either side of the bar.

As illustrated in FIGS. 3, 4, and 5, the resilient fingers 22 are positioned near the bases of the upward projections 17 about even with the level of the arcuate valley bottoms 18. The fingers thus cooperate with the projections 17 and valleys 18 by providing for the tomatoes an opening which corresponds to the position of each valley, wherein substantially all the shaking takes place. The fingers on either side of a given projection 17 on a bar 12 may be staggered from one another as indicated as a preferred feature of construction; the separate fingers on each side may be retained in separate openings through the bar 12, by any suitable retaining means. FIGS. 3 and 4 show the left and right sides of the bars 12, with one series of fingers 22 in view and the lush anchored ends 22a of the opposite fingers also visible. As an alternative means of connection (not shown), the two opposed fingers at each location may be integral and retained to the bar through a single opening, provided there is a rigid connection at the bar so that the two fingers can move independently of one another.

To those skilled in the art to which this invention relates, these and many other changes in construction and widely differing embodiments and applications of the invention will suggest themselves without departing from the spirit and scope of the invention. The disclosures and the description herein are purely illustrative and are not intended to be in any sense limiting.

I claim:

1. In a harvester for tomatoes and the like having a separator device comprising two series of parallel lengthwise extending walking bars with lengthwise extending gaps between them, the bars of one series alternating with those of the other series, and means for oscillating the bars so that any point on each bar moves in approximately a circle in a vertical plane, the bars of one series being 180° out of phase with the bars of the other series, the improvement comprising rows of slender resilient fingers secured to and extending transversely from the walking bars of one said alternating series, the fingers extending from both sides of each bar of said one series into the gaps on both sides of the bar, the fingers on the same side of said one series being spaced apart from each other wider than the width of each gap and being nearly as long as the width of a gap but slightly short of spanning the gap, and the fingers having sufficient resiliency so that when the fruit of the crop being harvested lands on a finger it gives and flexes and the fruit falls through and having sufficient rigidity to retain thereon stems, leaves and other lightweight vegetative matter.

2. The harvester apparatus of claim 1 wherein the walking bars of each series include spaced upward projections, said fingers being located near the base of each projection of said one series, with two fingers at each projection extending in opposite directions from the bar.

* * * * *